Oct. 18, 1966     P. S. JOSEPH ETAL     3,278,990
APPARATUS FOR MANUFACTURING TIRE

Original Filed Aug. 16, 1961     2 Sheets-Sheet 1

3,278,990
APPARATUS FOR MANUFACTURING TIRE
Philip Samuel Joseph, Akron, Ohio, and James Raymond Stanford, Salinas, Calif., assignors to The Firestone Tire & Rubber Company, Akron, Ohio, a corporation of Ohio
Continuation of application Ser. No. 131,848, Aug. 16, 1961. This application Mar. 30, 1964, Ser. No. 356,359
3 Claims. (Cl. 18—17)

This application is a continuation of application, Serial No. 131,848, filed August 16, 1961, now abandoned.

The invention relates to the manufacture, and more particularly to the vulcanization, of resilient articles such as pneumatic tires in which members such as curing bladders or bags are utilized during the vulcanization thereof.

In one form of tire vulcanization, a curing bladder or curing bag is inserted into tire carcass prior to vulcanization in a tire mold and remains in the carcass throughout the vulcanizing cycle. At the end of the cycle, the bladder or bag is removed from the vulcanized tire.

Due to the substantially air-impervious nature of both the tire and the vulcanizing member, damage is often inflicted to the tire during the removal of the bladder or bag because of the vacuum seal which is created between the outer surface of the bladder and the inner surface of the tire during the vulcanization or forming process. The force necessary to break this seal in separating the tire and the bladder often results in twisted and kinked tire beads, which render the tire unserviceable.

The present invention overcomes the aforementioned difficulties by providing a tire mold having novel means whereby to break the vacuum seal between the bladder and the tire, by introducing air pressure between them, thereby freeing the bladder for easy removal from the tire and minimizing the danger of damage to the tire.

It is therefore an object of the present invention to provide a tire mold having means to facilitate removal of a curing bladder or bag from a tire at the end of the vulcanizing cycle.

Another object is to provide a tire mold having means to break the seal between a curing member and a tire at the end of the vulcanizing cycle.

A more specific object is to provide a tire mold having fluid pressure means to dissipate the vacuum seal present between a curing bladder or a bag and a tire at the end of the vulcanizing cycle.

These and other objects and advantages will be more apparent by reference to the following specification and drawings in which.

Figure 1:
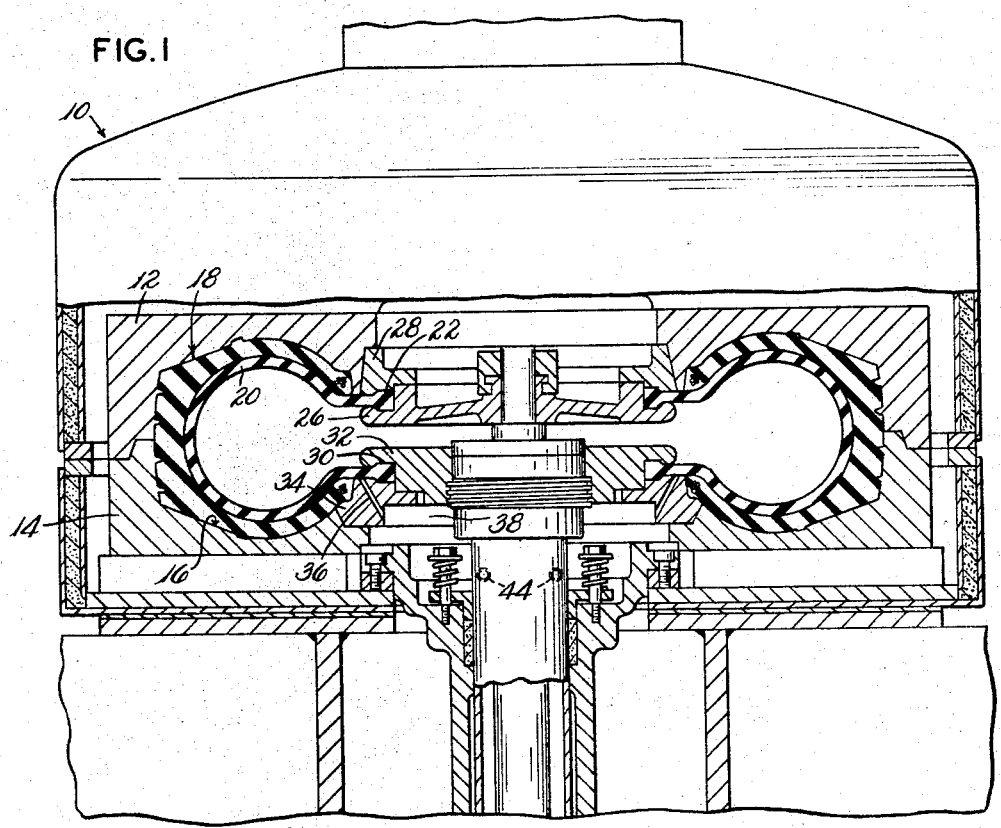
FIGURE 1 is a side elevation of a tire mold, partly broken away and in section, incorporating the apparatus of the invention.

Referring now to the drawings, a tire vulcanizing press, shown generally at 10, is comprised of an upper mold section 12 and a lower mold section 14, which form a tire molding cavity 16. Cooperating with the upper and lower mold sections 12 and 14 to shape and vulcanize a tire 18, is a curing bladder 20. The mold sections are suitably chambered (not shown) for the circulation of the vulcanizing media. Likewise, suitable inlet- and outlet-conduits (not shown) are provided for the circulation of curing media within the curing bladder 20.

The curing bladder 20 terminates in a beaded upper end portion 22, suitably held by rigid members 26 and 28, and in a beaded lower end portion 30, held by rigid members 32 and 34. The member 34 may also, as shown, serve as the lower tire-bead forming ring, or it may be a separate member, such as, for example, ring 28. The ring portion 34 is shown as provided with a plurality of passages 36 terminating adjacent the tire bead toe portion 37, and adjacent the outer surface 39 of the bladder 20. Passages 36 terminate inwardly at an annular chamber 38 formed by the surrounding components of the tire mold assembly. Extending into chamber 38 are inlet assemblies 40 connected by fittings 41 to a conduit 42 connected to a supply (not shown) of air or some other gas.

Inlet assemblies 40 are comprised of tubes 44 extending through passages 46 in the lower mold register ring 48, and are secured by lock-nuts 50 and back-up segments 52 attached to the tubes 44. Gaskets 54 provide fluid-tight seals between the mold register ring 48 and the assemblies 40.

Operation

Figure 3:
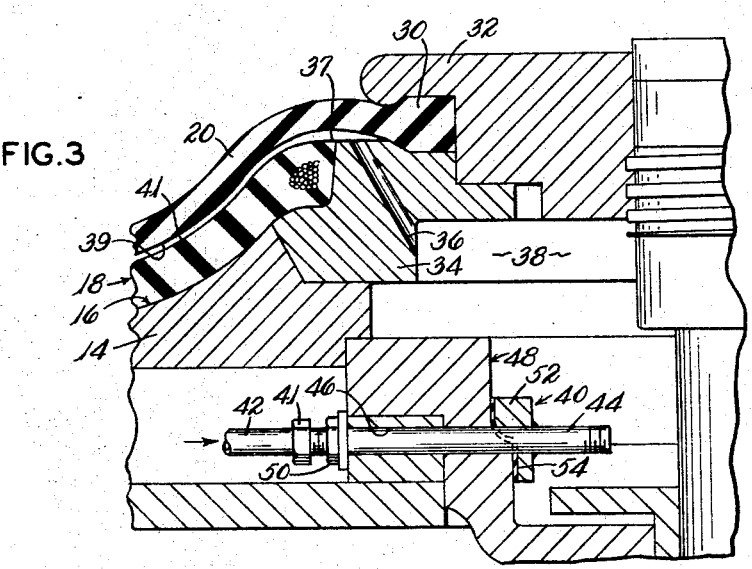
FIGURE 3 is an enlarged fragmentary sectional view showing the curing bladder separated from the vulcanized tire at the end of the curing cycle.
Figure 2:
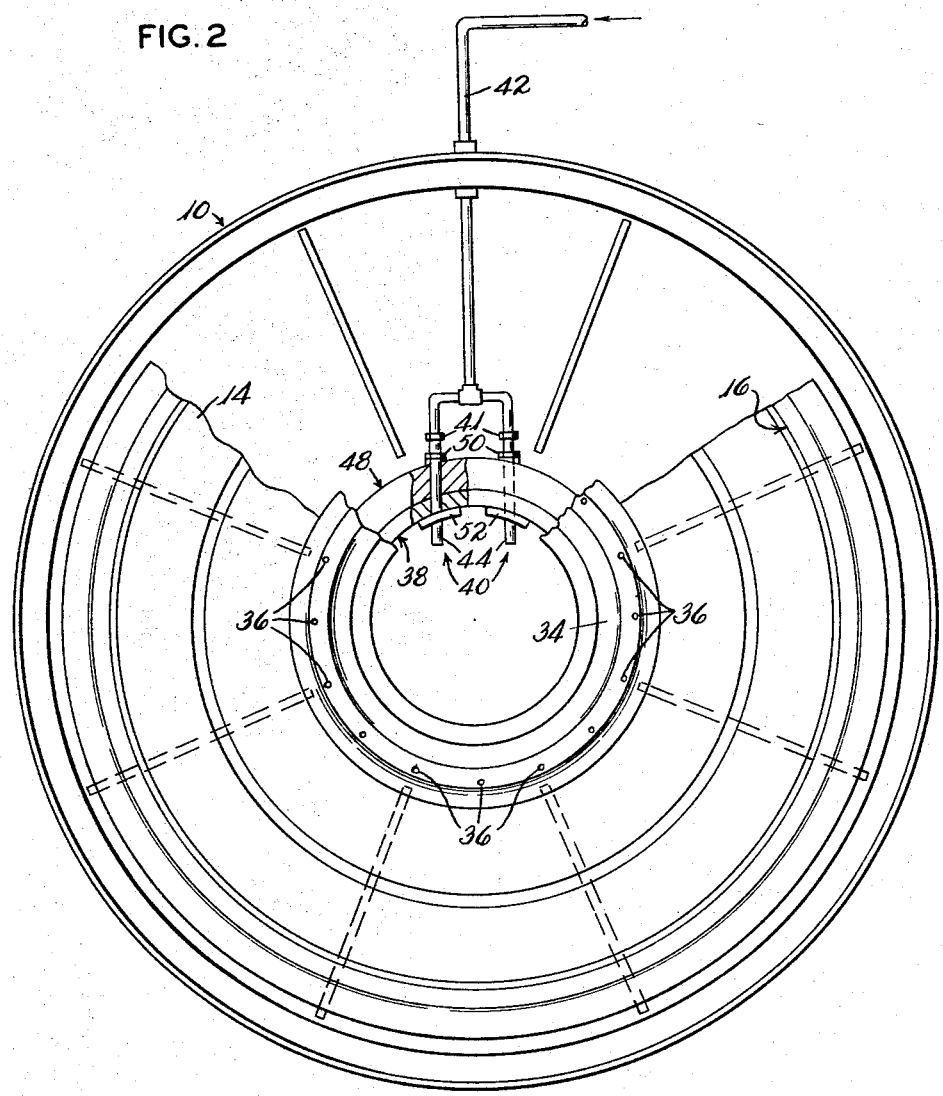
FIGURE 2 is a plan view of the bottom portion of the mold of FIGURE 1, with parts removed for clarity.

At the end of the vulcanizing cycle, after the vulcanizing media have been withdrawn, a fluid, either liquid or gaseous, under pressure is applied through conduit 42, tubes 44, into chamber 38, and conducted through passages 36 between the outer surface 39 of the curing bladder 20 and the inner surface 41 of the tire 18; see FIGURE 3. The fluid thus supplied breaks the vacuum seal, and separates the curing bladder from the inside of the tire, thereby permitting easy separation of the bladder from the tire without damage to the tire. A great number of tires were successfully separated from their vulcanizing members using compressed air.

It will be understood that, although the above description has proceeded with reference to the inlet passages 36 as being located in the tire bead-forming ring 34, the said passages may as readily be located in any of the mold portions which give access to the outer surface of the vulcanizing member near the tire interior.

Although the invention has been shown and described in conjunction with a tire mold employing a curing bladder, it is obvious that other types of curing members could be substituted for the bladder. Also, the invention could readily be used in conjunction with the molding of any article in which a curing bag or bladder is used in pressure contact with the article.

It is apparent from the foregoing that applicant has provided a novel means of removing curing bladders or bags from molded articles without damaging the articles, thereby providing substantial reduction in waste and savings in time and labor in the manfacturing of such articles.

While one form of the invention has been shown and described, it is clear that various modifications may occur to those skilled in the art without departing from the scope of the invention, the essential features of which are summarized in the appended claims.

What is claimed is:

1. Tire-vulcanizing apparatus comprising mold sections constituting a tire-receiving cavity, an annular, substantially air-impervious resilient vulcanizing member between said sections and bridging said cavity, and means to conduct fluid under pressure directly against the exterior surface of said resilient vulcanizing member to separate it from a resilient tire vulcanized therewith, said means comprising conduit means in one of said mold sections opening directly against the exterior surface of said vulcanizing member.

2. Tire-vulcanizing apparatus as in claim 1, wherein said conduit means terminates radially inwardly of said cavity.

3. Tire-vulcanizing apparatus as in claim 1, wherein said conduit means comprises a plurality of passages.

References Cited by the Examiner

UNITED STATES PATENTS

| 2,880,458 | 4/1959 | Frohlich et al. | 18—17 |
| 3,029,469 | 4/1962 | Moore et al. | 18—17 |

J. SPENCER OVERHOLSER, *Primary Examiner.*

J. H. FLINT, *Examiner.*